United States Patent [19]

Cabanaw

[11] Patent Number: 4,483,844
[45] Date of Patent: Nov. 20, 1984

[54] SYSTEM AND PROCESS FOR PRODUCING ELEMENTAL SULFUR

[75] Inventor: Boyd E. Cabanaw, Tulsa, Okla.

[73] Assignee: Standard Oil Company (Indiana), Chicago, Ill.

[21] Appl. No.: 518,512

[22] Filed: Jul. 29, 1983

[51] Int. Cl.³ .............................................. C01B 17/04
[52] U.S. Cl. ................................. 423/574 R; 423/576
[58] Field of Search ............... 423/574 R, 574 G, 576; 422/115, 171, 190

[56] References Cited

U.S. PATENT DOCUMENTS

| Re. 28,830 | 5/1976  | Hunt, Jr. et al. ................ 423/574 G |
| 2,767,062  | 10/1956 | Duecker ............................. 423/576 |
| 3,749,762  | 7/1973  | Montgomery .................... 423/574 G |
| 4,035,474  | 7/1977  | Kunkel et al. .................... 423/574 R |
| 4,180,554  | 12/1979 | Goddin, Jr. et al. ............. 423/574 R |
| 4,309,402  | 1/1982  | Al-Muddaris ..................... 423/574 R |
| 4,315,904  | 2/1982  | Lell et al. ........................ 423/574 R |

FOREIGN PATENT DOCUMENTS 938087 12/1973 Canada ............................ 423/574 R

OTHER PUBLICATIONS

"MCRC Process for Improving Claus Plant Recovery", A. B. Coady, 6-9-1976: Presented to Canadian Natural Gas Processors' Association.
"MAXISULF-A Process to Enhance Sulfur Recovery in Claus Plants", R. Lell and U. Neumann, Davy McKee AG.
"The MCRC Sub-Dewpoint Sulphur Recovery Process", R. E. Heigold and D. E. Berkeley, Delta Projects Limited.

Primary Examiner—Earl C. Thomas
Assistant Examiner—Jeffrey E. Russel

[57] ABSTRACT

A three catalytic reactor system and process is disclosed for obtaining acceptable levels of sulfur recovery from acid gas at a cost significantly less than that required for a standard modified four reactor cold bed adsorption (CBA) system. The system and process utilize two conventional Claus reactors and one cold bed adsorption (CBA) reactor in series. Four condensers are provided, one disposed before each of the catalytic reactors and one on a process line connecting the third catalytic (CBA) reactor to the first catalytic reactor. The system is designed to operate either in a normal adsorption mode or in a regeneration mode. In the normal adsorption mode, the second Claus reactor is operated at a closer sulfur dewpoint approach then the second Claus reactor in the standard CBA system. In the regeneration mode, gas downstream of the thermal reactor is directed first to the second Claus reactor and then, after removal of sulfur and reheating, to the CBA reactor. Thus, the second and third catalytic reactors are regenerated simultaneously. The first catalytic reactor is placed on cold bed adsorption during the regeneration mode. Effluent from the first catalytic reactor is then passed through the second condenser and to the tail gas stack.

12 Claims, 2 Drawing Figures

NORMAL ADSORPTION

REGENERATION

SYSTEM AND PROCESS FOR PRODUCING ELEMENTAL SULFUR

BACKGROUND OF THE INVENTION

This invention relates to processes and systems for producing elemental sulfur. In particular, it relates to recovering elemental sulfur from acid gas using an extension of the modified Claus process.

The modified Claus process is widely used by the industry for the production of elemental sulfur. The process is designed to carry out the Claus reaction:

$$2H_2S + SO_2 \xrightarrow{catalyst} 2H_2O + 3S$$

The reaction is favored by low temperature and by removal of elemental sulfur vapor.

In the conventional modified Claus process, the operating conditions of the reactors in which the Claus reaction is carried out are selected to maintain elemental sulfur in the vapor state. Otherwise, the elemental sulfur would deposit on the catalyst and deactivate it. To assure high conversion, the reaction is carried out in a plurality of consecutive reactors. Elemental sulfur is condensed and removed from the effluent of a preceding reactor before it is passed to a subsequent reactor. The removal of sulfur allows the reactors to be maintained at progressively reduced temperatures.

Often, environmental regulations require sulfur recoveries higher than those attainable with the conventional modified Claus process. Several alternatives are available for attaining these higher recoveries. For example, the tail gas from a conventional two-catalytic reactor Claus unit can be further treated by a conventional SCOT or Beavon process. These processes attain high recoveries, often well in excess of those required by regulatory agencies, however, their capital expenditures and operating costs are quite high.

An alternative to such processes is known as the Cold Bed Adsorption (CBA) process. This process is capable of theoretical recoveries well above those attainable with a conventional modified Claus process, although slightly less than those attainable with the SCOT or Beavon process. The capital expenditure and operating costs for the CBA process are less than those for SCOT or Beavon but still high. The conventional CBA process includes a thermal reactor, two conventional catalytic reactors and two low temperature catalytic reactors, known as cold bed adsorption (CBA) reactors. The reaction in a CBA reactor is generally carried out at inlet temperatures ranging from about 250°–280° F. (121°–138° C.). These low temperatures favor the forward Claus reaction and result in continuous condensation of elemental sulfur onto the alumina catalyst. By removing this sulfur from the gas phase, Claus equilibrium is further improved. The catalyst can retain approximately half its weight in sulfur before it begins to lose activity. The sulfur condensing on the catalyst tends to deactivate it. Accordingly, a second CBA reactor is provided so that while the first CBA reactor is in the recovery mode, the second reactor is being regenerated to remove liquid sulfur and vice versa.

One of the major factors contributing to the expense of the CBA process are the reactors. The elimination of one of the reactors from the CBA process would significantly reduce both overall capital expenditures and operation costs, but would tend to lower recovery to unacceptable levels.

A number of processes have been designed in an attempt to achieve acceptable recovery at lower costs. Delta Engineering Corporation's MCRC Process uses three catalytic reactors. The first catalytic reactor operates above the dewpoint of sulfur throughout the process. One of the remaining two reactors is operated below the dewpoint of sulfur (low temperature reactor) while the other reactor is being regenerated. When the catalyst in the low temperature reactor becomes deactivated due to sulfur deposits, the inputs to the two reactors are switched so that the catalyst in the reactor which was operated at a low temperature is regenerated by the high temperature gas and the reactor with the regenerated catalyst therein is operated at a temperature below the dewpoint of sulfur. The reactor operating in the regeneration mode is fed with a gas stream from the heat exchanger after the first catalytic reactor. This heat exchanger must be of large area and must operate at high temperature in order to supply the necessary heat for regeneration. This is, of course, an expensive equipment item. Claus equilibrium in the reactor being regenerated is much poorer than in a conventional second position Claus reactor. As a result, large concentrations of $H_2S$ and $SO_2$ reach the subdewpoint reactor causing it to load excessively with liquid sulfur before the second position reactor can be adequately regenerated. This high loading reduces catalyst activity and allows entrainment of liquid sulfur from the CBA bed. Accordingly, a coalescer is added downstream of the CBA although even with this enhancement acceptable recoveries may still be unattainable. The coalescer also adds to the overall cost of the system and further diminishes the savings achieved by the elimination of a catalytic reactor.

Another prior art process which attempts to achieve acceptable recovery levels at a cost comparable to a conventional CBA process is the Maxisulf system of Davy McKee AG. The Maxisulf process provides two low temperature reactors, one of which operates as the low temperature reactor while the other is regenerated. The regeneration of the low temperature catalytic reactor is accomplished by forcing therethrough a stream of hot gas from an inline burner. The hot gas flows through the reactor in the opposite direction from the low temperature gas.

This process suffers from several drawbacks. First, the alternating directions of flow accelerate the degradation of the catalyst. Second, the process utilizes an extra burner and fuel gas, both of which increase the overall cost. Third, the process introduces a dangerous condition. If oxygen is present in the regeneration gas stream, it can sulfate and therefore deactivate the catalyst. This problem can be overcome by contacting the regeneration gas with $H_2S$, but such contacting would further add to the cost of the process. Fourth, the quality of the fuel gas must be carefully controlled to avoid the introduction of unburned hydrocarbons into the low temperature reactor. Otherwise, the hydrocarbon would be cracked and produce a tar, which, in turn, would coat and therefore deactivate the catalyst. Finally, the inline burner adds an additional volume of gas which must be treated and processed, and which reduces the attainable recovery level.

Thus, the prior art processes have not been entirely successful in solving the problem of reducing the overall cost of the conventional CBA process. There is therefore a long-felt and still unsatisfied need for a process and a system that would require fewer reactors than the conventional CBA process, but still achieve the high required overall recovery of sulfur without the need for a further treatment of the tail gas and without the need for additional expensive components. The present invention achieves the above-stated goal.

BRIEF DESCRIPTION OF THE INVENTION

The present invention significantly improves the efficiency and the economy of processes and systems for the production of elemental sulfur from acid gas. The process and system of the present invention achieves an acceptable recovery level of elemental sulfur from acid gas using only three catalytic reactors, the process and the system allowing a second catalytic reactor to operate safely at a lower sulfur dewpoint approach than in prior art systems.

The process of the present invention operates in two modes: a normal adsorption mode and a regeneration mode. In the normal adsorption mode, the first two catalytic reactors operate at temperatures above the sulfur dewpoint of the gas flowing through them; and the third catalytic reactor (CBA) operates at temperatures below the dewpoint of sulfur. The process of this invention allows an efficient operation of the second catalytic reactor at as low as about a 1°–15° F. (0.5°–8° C.) dewpoint approach instead of the conventional 25°–35° F. (14°–19° C.) approach. This improves Claus equilibrium in the second catalytic reactor, thus reducing the loading rate of the third catalytic reactor (CBA). This improves recovery, both by increasing the relative length of the high-recovery normal adsorption cycle and by increasing the recovery during the normal adsorption cycle itself. This unexpectedly low dewpoint approach is made possible by periodic high temperature regeneration of both the second and the third catalytic reactors while operating the first catalytic reactor below the dewpoint of sulfur (as a CBA reactor). The second catalytic reactor is regenerated using a hot gas produced by combining the gas directly from the waste heat boiler with the gas from the first condenser. The temperature of the hot gas is in the range of about 430°–625° F. (221°–329° C.). The effluent from the second catalytic reactor is cooled to condense elemental sulfur vapor and to recover elemental sulfur therefrom. The gas is then heated to the temperature in the range of about 430°–650° F. (221°–343° C.) and this heated gas is then used to regenerate the third catalytic reactor.

As a result of the invented process and system, the overall recovery of sulfur is unexpectedly high because the recovery in the normal adsorption mode is better than in the conventional CBA process; the overall sulfur recovery is reduced only slightly in the regeneration mode because the first catalytic reactor is operated as a CBA reactor during regeneration of the second and third catalytic reactors; and the process can be operated in the high recovery normal adsorption mode over 75% of the total time.

DETAILED DESCRIPTION OF THE INVENTION

Figure 1A:
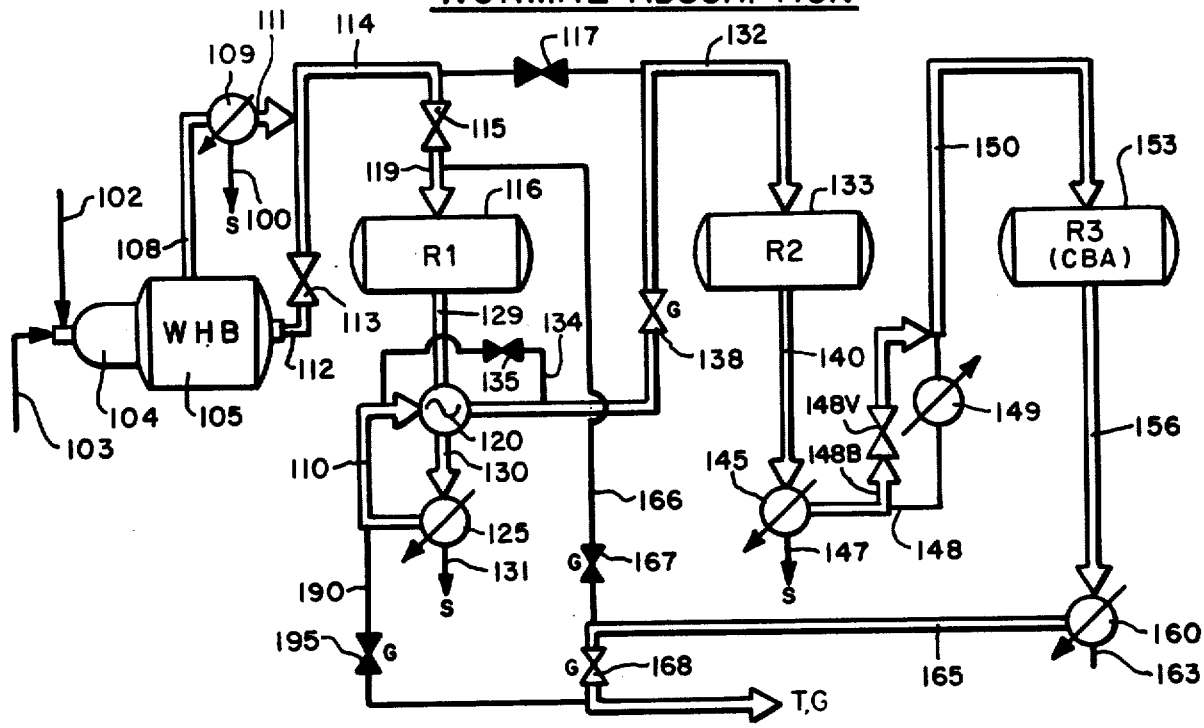
FIG. 1A is a schematic of a preferred embodiment of the process and the system of the present invention operating in the normal adsorption mode.

The present invention provides a process and a system for inexpensive and efficient production of elemental sulfur from an acid gas. The improved economy of the process over the conventional CBA system is achieved by the elimination of one of the low temperature reactors and by simplification of the valving and piping. Further, operating costs are reduced, due, for example, to reduced pressure drop and consequently reduced energy requirements. The process and system of the present invention are designed to produce high recovery levels without a fourth catalytic reactor and without adding additional expensive equipment for further treatment of the tail gas or for effecting regeneration of the catalyst.

It has been discovered that the second catalytic reactor in the CBA process can be efficiently operated at a dewpoint approach of about 1°–15° F. (0.5°–8° C.), preferably in the range of about 5°–15° F. (3°–8° C.) for a satisfactory operating margin above the sulfur dewpoint, during normal adsorption if both the second and the third catalytic reactors are periodically regenerated with a high temperature gas. During regeneration, the first catalytic reactor is operated below the dewpoint of sulfur, i.e., as a CBA reactor. The gas used for regeneration of the second catalytic reactor is a combined stream of the gas from the first condenser and the hot gas from the waste heat boiler. The effluent from the second catalytic reactor is cooled to condense elemental sulfur vapor and then heated. The heated gas is then used to regenerate the third catalytic reactor.

Because during the normal adsorption mode, the first and second catalytic reactors are operated above the sulfur dewpoint of the gas flowing through them, there is no continuous condensation of elemental sulfur onto the catalyst as in a CBA reactor. However, even in conventional Claus reactors, the catalyst adsorbs liquid sulfur until an equilibrium sulfur loading is reached and this equilibrium sulfur loading increases as the sulfur dewpoint approach in a reactor decreases. For this reason, conventional Claus reactors are normally operated at a sulfur dewpoint approach of at least 25°–35° F. (14°–19° C.) to prevent the equilibrium sulfur loading from being so high that catalyst activity becomes impaired. As the dewpoint approach is lowered below this level, conversion increases for a while due to the lower reaction temperatures, but eventually decreases due to catalyst deactivation as the sulfur loading on the catalyst increases. Therefore, sustained operation at a dewpoint approach below about 25°–35° F. is not feasible unless the catalyst is periodically regenerated to remove adsorbed sulfur.

In the regeneration mode, the process of this invention allows simultaneous regeneration of the second and third catalytic reactors to occur, with the reheated effluents from the first and third condensers serving as regeneration gas. Because the process of this invention periodically regenerates the second catalytic reactor, it can efficiently be operated at a dewpoint approach of about 1°–15° F. (0.5°–8° C.), preferably about 5°–15° F. (3°–8° C.) during normal adsorption mode operation. A consequence is that the third catalytic reaction zone can be maintained at a correspondingly lower temperature since the sulfur loading rate and the temperature rise in the third catalytic reaction zone are diminished. During the regeneration of the second and third catalytic reactors, the first catalytic reactor recovers sulfur by the cold bed adsorption (CBA) process.

In the regeneration mode, the hot gas from the boiler is mixed with the gas from the first condenser and the combined gas is fed to the second catalytic reactor. The temperature of the combined gas is sufficiently high to effect an efficient regeneration of the catalyst but sufficiently low to prevent undue degradation of the catalyst.

The sensible heat from the hot gas causes vaporization of sulfur. The Claus reaction proceeds in the second catalytic reactor while the sulfur is being vaporized from the catalyst. The Claus reaction generates additional heat which further facilitates vaporization of sulfur. The vaporization of sulfur consumes heat and thereby prevents a temperature rise across the reactor which, in turn, improves the equilibrium of the Claus reaction.

The hot effluent from the second catalytic reactor is passed through a condenser where elemental sulfur is removed. Then the condenser effluent can be heated in a heat exchanger, or combined with the hot gas from the boiler, or combined with a bypassed portion of the second reactor effluent and fed into the third catalytic reactor (the CBA reactor) as a hot gas regeneration stream. Combinations of these reheat methods could also be used. The heat from the hot gas causes vaporization of sulfur. However, the regeneration in the third catalytic reactor proceeds slightly slower than in the second catalytic reactor because the lower $H_2S$ and $SO_2$ concentration in the inlet gas results in less Claus reaction and therefore less heat generation. The effluent from the third catalytic reactor is passed through a condenser and fed directly into the first catalytic reactor. The recovery of sulfur during the regeneration of the second and third catalytic reactors is slightly lowered but remains high since the first catalytic reactor operates as a CBA reactor.

Since the third catalytic reactor is operated at high (Claus) temperatures during the regeneration mode, more $H_2S$ and $SO_2$ reach the CBA reactor (reactor 1) during the regeneration mode than reach the CBA reactor (reactor 3) during the normal adsorption mode. Therefore, the first catalytic reactor should remain in adsorption mode only as long as is required for complete regeneration of the second and third reactors to avoid loading the catalyst in the first catalytic reactor to unacceptable high levels of liquid sulfur. Since gas is fed into the second and third reactors at high temperatures, the vaporization of sulfur takes a relatively short period of time. The process is then switched back to the normal adsorption mode.

During the first few hours of the adsorption mode, the first catalytic reactor is rapidly regenerated. It then operates as a standard first portion Claus reactor for the remainder of the normal adsorption period.

Since the recovery during the regeneration mode is only slightly lowered, and since the regeneration mode typically represents less than 25% of the total cycle time, the overall average recovery is very high even though only three catalytic reactors are used in the process.

The system of the present invention is designed to operate in two modes: the normal adsorption mode and the regeneration mode. In the normal adsorption mode, the process for the present invention is carried out as follows. Acid gas and air are fed into a conventional Claus thermal reactor. The effluent from the thermal reactor is cooled in a waste heat boiler, passed through a first condenser to remove sulfur, reheated and fed into a first catalytic reactor at a temperature in the range of 430°–625° F. (221°–329° C.). The effluent from the first catalytic reactor is passed through a second condenser to remove additional sulfur. The gas from the second condenser is heated and passed to a second catalytic reactor. The second catalytic reactor is generally operated at a sulfur dewpoint approach of 1°–15° F. (0.5°–8° C.), preferably 5°–15° F. (3°–8° C.), which normally corresponds to an inlet temperature in the range of about 370°–380° F. (188°–193° C.). The effluent from the second catalytic reactor is passed through a third condenser where elemental sulfur is recovered. The effluent from the third condenser is fed directly into a low temperature catalytic reactor such as a cold bed adsorption (CBA) reactor. The low temperature catalytic reactor is operated below the dewpoint of sulfur, generally at an inlet temperature in the range of about 250°–280° F. (121°–138° C.) which results in the condensation of elemental sulfur on the alumina catalyst. Once the sulfur loading on the catalyst exceeds an acceptable level, the process is switched into the regeneration mode.

In the regeneration mode, both the second and third catalytic reactors are regenerated simultaneously. Reheated effluents from the first and third condensers serve as regeneration gas. The second catalytic reactor is operated at a low sulfur dewpoint approach. Accordingly, it has a high equilibrium sulfur loading and it must be periodically regenerated to avoid catalyst deactivation by liquid sulfur. The high temperature effluent gas from the second catalytic reactor is initially inadequate as regeneration gas for the third catalytic (CBA) reactor because of its high sulfur content. Hence, it can be first passed through a condenser where elemental sulfur is removed and then reheated to a range from about 430°–650° F. (221°–343° C.). However, after all the sulfur has been vaporized from the bed of second catalytic reactor, it is possible to bypass all or a portion of the second catalytic reactor effluent directly to the third catalytic reactor as regeneration gas. The sulfur rapidly vaporizes from the second catalytic reactor bed and is essentially completely removed after the first few hours of the regeneration period. The reactor is then "soaked" for several hours at high temperature to insure total recovery of catalyst activity.

During regeneration of the second catalytic reactor, two phenomena take place simultaneously. First, the hot gas heats up and vaporizes the sulfur which is deposited on the catalysts. Second, $H_2S$ and $SO_2$ combine to produce additional elemental sulfur. The two phenomena assist each other. The vaporization consumes heat and thereby prevents a temperature rise across the reactor. The lower temperature favors the Claus reaction. Similarly, the Claus reaction generates heat which further facilitates the vaporization of sulfur. A similar phenomenon occurs in the third catalytic reactor except that less Claus reaction heat is generated.

The effluent from the third catalytic reactor is cooled in a condenser and additional sulfur is recovered. The effluent at about 250°–280° F. (121°–138° C.) is then passed directly to the first catalytic reactor, which is operated below the dewpoint of sulfur (cold bed adsorption) during the regeneration of the second and third catalytic reactors. The effluent from the first catalytic reactor is cooled in a condenser and directed to the tail gas stack (not shown).

The present invention will now be described in connection with the preferred embodiment depicted in the drawings.

DESCRIPTION OF THE PREFERRED EMBODIMENT OF THE PRESENT INVENTION

Figure 1B:
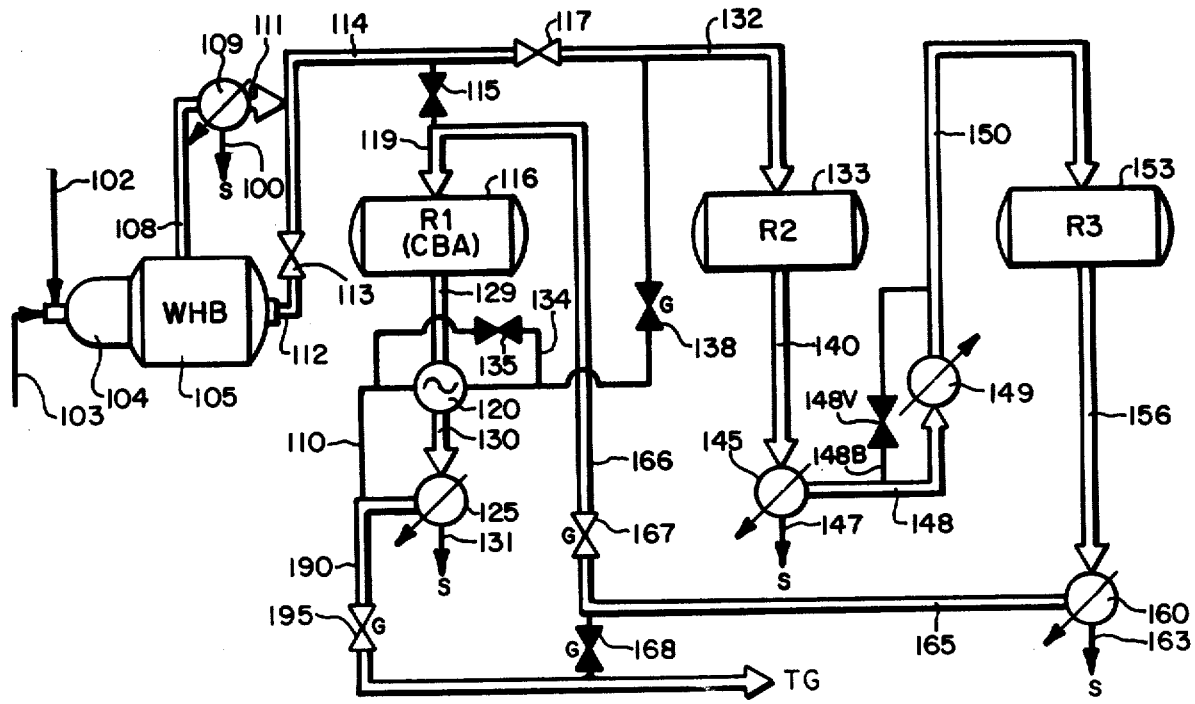
FIG. 1B is a schematic of a preferred embodiment of the process and the system of the present invention operating in the regeneration mode.

FIGS. 1A and 1B depict the preferred embodiment of the process and the system of the present invention. The valves which are open are not shaded and those which are closed are shaded. FIG. 1A shows the operation of the process of the present invention in the normal adsorption mode and FIG. 1B shows the operation of the process of the present invention in the regeneration mode. Like numbered elements of FIGS. 1A and 1B refer to identical elements. Referring now to FIG. 1A, air and acid gas are fed into a thermal reactor 104 via lines 102 and 103, respectively. Effluent gases from a thermal reactor 104 are cooled in the first pass of a waste heat boiler 105. The resulting gases are split. One portion is further cooled in a second boiler pass to about 550° F. (288° C.) and then passed via a line 108 to a first condenser 109 which condenses sulfur vapor. The sulfur is removed from condenser 109 via a line 100 and recovered. The gases leave the first condenser 109 via a line 111 at about 400° F. (204° C.).

The second (single pass) portion of the effluent from the boiler 105 is at about 1100° F. (593° C.). It is passed via a line 112 and a valve 113, after which it is combined with effluent from the line 111. The resulting gas stream 114 is at about 550° F. (288° C.). The gas stream 114 is passed through a valve 115 and via a line 119 to a catalytic reactor 116 where further conversion of $H_2S$ and $SO_2$ into elemental sulfur takes place. The effluent from the reactor 116 is passed through a heat exchanger 120 and a second condenser 125 via lines 129 and 130. Elemental sulfur is recovered from the second condenser 125 via a line 131. The resulting gaseous stream is then passed via a line 110 through the heat exchanger 120, through a tight sealing valve (such as a Gutermuth valve) 138, via a line 132 and into a second catalytic reactor 133. The temperature of the gas fed into the second catalytic reactor is controlled using a bypass line 134 with a valve 135. The temperature of the gas stream in the line 110 is generally about 300° F. (149° C.) and the temperature of the gas stream in the line 132 is generally about 370°-380° F. (188°-193° C.). In the second catalytic reactor 133 further conversion of $H_2S$ and $SO_2$ into elemental sulfur takes place. The effluent from the second catalytic reactor 133 is passed via a line 140 into a third condenser 145. The resulting elemental sulfur is recovered from the third condenser 145 via a line 147. The gas stream leaves the third condenser 145 at a temperature of about 260° F. (127° C.) and it is passed via a line 148B and valve 148V bypassing past heater 149 and via a line 150 to a CBA reactor 153 at a temperature in the range of about 250°-280° F. (121°-138° C.). The sulfur produced in the CBA reactor 153 is adsorbed onto the catalyst bed. Effluent from the CBA reactor 153 is passed via a line 156 to a fourth condenser 160. No sulfur is removed from this condenser during this period. The gas stream exits from the fourth condenser 160 via line 165 through a tight sealing valve 168 (such as the Gutermuth valve) to a tail gas (T.G.) stack. Tight sealing valve 167 prevents flow communication between line 165 and line 166 and tight sealing valve 195 prevents flow communication between line 190 and line 165 during normal adsorption mode.

The operation in the normal adsorption mode is continued until the catalyst in the CBA reactor 153 begins to become deactivated by sulfur deposits. Alternatively, and preferably, operation in normal adsorption mode is continued until sulfur loading is at a predetermined level somewhat less than the level at which instantaneous recovery begins to fall off. At that point, the operation of the system is switched to the regeneration mode shown in FIG. 1B.

Referring now to FIG. 1B, the effluent gases from the thermal reactor 104 are cooled in the first pass of waste heat boiler 105. One portion is further cooled in a second boiler pass to about 550° F. (288° C.) and then passed via the line 108 to the first condenser 109 which condenses sulfur vapor. The gases leave the first condenser 109 via the line 111 at about 400° F. (204° C.). The sulfur is removed from the condenser 109 via the line 100 and recovered.

The second portion of the effluent from the waste heat boiler 105 is at a temperature of about 1100° F. (593° C.). It is passed via a line 112 and a valve 113 and combined in the line 114 with gases leaving the first condenser 109 via the line 111. The relative volumes of gases being combined in the line 114 are selected to produce a gas stream at a temperature of about 550° F. (288° C.). The valve 115 is closed during regeneration and a valve 117 closed during normal adsorption mode, is opened. Accordingly, the gas steam 114 flows via valve 117 and the line 132 into the second catalytic reactor 133. Since this stream is at a temperature of about 550° F. (288° C.), it vaporizes sulfur deposited on the catalyst and thereby restores the catalyst activity. From the reactor 133 effluent is passed via the line 140 to the third condenser 145. Elemental sulfur is recovered from the third condenser 145 via a line 147. The effluent from the third condenser 145 is passed via a line 148 to heater 149, functional during regeneration mode, where it is heated to about 600° F. (315° C.). Then the effluent is fed via the line 150 to the third catalytic reactor 153. Again, sulfur on the catalyst is vaporized thereby restoring catalyst activity. From the third catalytic reactor 153 effluent is passed via the line 156 to the fourth condenser 160. Sulfur is recovered from the fourth condenser 160 via the line 163. Then the effluent from the fourth condenser 160 is passed via lines 165, 166 and 119 past the valve 167 to the first catalytic reactor 116.

During regeneration mode, the sensible heat supplied by the regeneration gas combines with the heat regenerated by the Claus reaction to heat the catalyst, refractory, reactor shell, regeneration gas line, and adsorbed elemental sulfur. A plateau temperature is reached when all available sensible and generated heat is consumed as latent heat by vaporizing sulfur. The reactor effluent temperature remains at the plateau temperature until most of the adsorbed sulfur has vaporized, then continues to rise to a soak temperature. The length of the soak period is not critical and its purpose is to provide a margin of safety to insure total regeneration of the catalyst. After the soak period is completed, the valves are switched back to the adsorption mode. However, approximately two hours are required for cooling the regenerated reactor back to CBA operating temperatures and conversion levels. This cooling period is considered to be part of the regeneration mode.

The first catalytic reactor 116, as indicated above, operates on cold bed adsorption during the regeneration cycle. The effluent is passed via the line 129 to the heat exchanger 120 and therefrom via the line 130 to the second condenser 125. No elemental sulfur is removed from this condenser during this period. The effluent from the second condenser 125 is then passed via a line 190 through a tight-sealing valve (such as a Gutermuth valve) 195 to the tail gas stack (not shown).

As indicated, during regeneration mode, the first catalytic reactor is operated in adsorption mode. At the end of regeneration of the second and third catalytic reactors, the first catalytic reactor is loaded with adsorbed sulfur. Upon switching back to normal adsorption mode, the inlet gas and heat of reaction rapidly causes the catalyst in the first catalytic reactor to undergo heating, plateau, and soak in a manner such as in the second catalytic reactor during regeneration. The first catalytic reactor then operates as a first position Claus reactor for the duration of the normal adsorption period. In 4-catalytic reactor systems, the CBA being regenerated is first cooled before being placed on adsorption. This is not possible with 3-catalytic reactor schemes, hence there will be a 1-2 hour period of reduced recovery immediately after valve switching while the CBA reactor cools to CBA inlet temperatures.

A second source of recovery losses occurs during valve switching when rich gas can be bypassed to the tail gas line. Normally these losses will be insignificant as complete valve switching should take no more than 2-15 minutes. Referring to FIG. 1A, in switching from normal operation to regeneration the valve sequence should proceed (in order) 117, 115, 138, 195, 167 and 168. Gutermuth valves should be installed for valves 138, 195, 167 and 168 to prevent leakage. This sequence does not allow sulfur-rich gas to be bypassed to the tail gas line. On switching back to normal operation, the reverse valve sequence should be followed.

Overall, the system and process of the present invention provides favorable average recovery levels. For example, a 99.2% theoretical average recovery level was calculated for 58% H$_2$S acid gas, and higher theoretical recovery levels have been calculated for richer feeds.

Further, the system and process of the present invention is easy to operate. The piping and valving are also simple: the piping is only slightly more complex than that required for a conventional three reactor Claus unit, and only six additional valves are required above those for the three reactor Claus unit. Very few modifications would be required to convert existing three reactor units to the system of the present invention. Still another advantage of the present invention is the long adsorption cycle obtained as a result of the more favorable equilibrium in the second catalytic reactor 133 which reduces the loading rate of the third catalytic reactor 153.

The following example is provided for illustrative purposes and is not intended to limit the claimed invention in any manner.

EXAMPLE

The theoretical recoveries of sulfur were calculated for the process of the present invention for the following operating conditions and a 58% H$_2$S acid gas having below specified composition.

Operating Conditions
  Normal Adsorption Mode
    Feed to the first catalytic reactor at about 550° F. (288° C.).
    Feed to the second catalytic reactor at about 380° F. (193° C.)—15° F. dewpoint approach.
    Feed to the third catalytic reactor at about 260° F. (127° C.).
  Regeneration Mode
    Feed to the second catalytic reactor at about 550° F. (288° C.).
    Feed to the third catalytic reactor at about 650° F. (343° C.).
    Feed to the first catalytic reactor at about 260° F. (127° C.).

| Composition of Acid Gas | |
|---|---|
| Component | Lb. Mols/hr. |
| H$_2$S | 266.8 |
| CO$_2$ | 169.3 |
| H$_2$O | 26.6 |
| CH$_4$ | 1.0 |

The following theoretical sulfur recoveries were obtained assuming a maximum sulfur loading on the CBA reactor of 0.5 pounds sulfur per pound of catalyst.

| Period | Time (Hours) | Sulfur Recovery (Weight %) |
|---|---|---|
| Normal Adsorption Mode | 35.7 | 99.3 |
| Regeneration Mode | | |
| Heating | 2.0 | 98.4 |
| Plateau | 1.0 | 98.9 |
| Soaking | 4.0 | 98.6 |
| Cooling | 2.0 | 98.9 |
| Total | 44.7 | Avg. 99.2% |

This example demonstrates that when an acid gas containing 58% of H$_2$S is used, an overall average recovery above 99 weight percent can be achieved using the process and the system of the present invention and that the recovery of sulfur falls slightly below 99% only for a short period of time.

Many changes and modifications will occur to those skilled in the art upon studying this disclosure. All such changes and modifications that fall within the spirit of this invention are intened to be included within its scope as defined by the appended claims.

I claim:

1. In a Cold Bed Adsorption process of the type including in the adsorption mode the steps of reacting acid gas and air in a thermal reaction zone, reacting the resulting gas in three catalytic reaction zones arranged in series and maintained at progressively reduced temperatures, the last of said catalytic reaction zones being periodically maintained below the dewpoint of sulfur, the effluent from the thermal reaction zone and a first catalytic reaction zone being cooled to recover sulfur and the gas being then heated to a desired temperature and fed to the subsequent reaction zone, the improvement comprising:
   in the adsorption mode, maintaining a second catalytic reaction zone at a sulfur dewpoint approach below about 25° F. (14° C.) and as low as about 1° to 15° F. (0.5° to 8° C.) to diminish sulfur loading rate and temperature rise in the third catalytic reaction zone; and
   in the regeneration mode, feeding the gas from the thermal reaction zone to the second catalytic reaction zone to regenerate the catalyst therein, cooling the effluent from the second catalytic reaction zone and removing sulfur, then heating the effluent and feeding the heated effluent therefrom to the third catalytic reaction zone to regenerate the catalyst therein.

2. The process of claim 1 wherein the gas is fed to the second and third reaction zones at a temperature sufficiently high to efficiently regenerate the catalyst but sufficiently low to avoid damaging the catalyst.

3. The process of claim 1 wherein in the regeneration mode the gas is fed to the second catalytic reaction zone at a temperature of about 430°-625° F. (221°-329° C.).

4. The process of claim 3 wherein in the regeneration mode the gas is fed to the third catalytic reaction zone at a temperature of about 430°-650° F. (221°-343° C.) and the effluent from said third catalytic reaction zone is cooled to condense and remove vaporized elemental sulfur and fed to the first catalytic reaction zone at a temperature in the range from about 250°-280° F. (121°-138° C.).

5. The process of claim 4 wherein time for regenerating the catalyst in the second and third reaction zones comprises less than about 25 percent of the time of a complete adsorption/regeneration cycle.

6. The process of claim 4 wherein in the adsorption mode the inlet temperature to the first catalytic reaction zone is in the range of about 430°-625° F. (221°-329° C.), the inlet temperature to the second catalytic reaction zone is in the range of about 370°-450° F. (188°-232° C.), and the inlet temperature to the third catalytic reaction zone is in the range of about 250°-280° F. (121°-138° C.).

7. An improved process for producing and recovering elemental sulfur from acid gas, said process comprising:
(a) reacting acid gas and air in a thermal reaction zone maintained at such conditions so as to facilitate the Claus reaction, to produce elemental sulfur vapor;
(b) cooling the gas produced in the thermal reaction zone to condense the elemental sulfur vapor and recovering elemental sulfur therefrom; then,
(c) heating the cooled gas; then,
(d) reacting the heated gas, in the presence of a catalyst for facilitating the Claus reaction, in a first catalytic reaction zone to produce elemental sulfur vapor therein;
(e) cooling the gas produced in the first catalytic reaction zone to condense the elemental sulfur vapor and recovering elemental sulfur therefrom; then,
(f) heating the cooled gas; then,
(g) reacting the heated gas, in the presence of a catalyst for facilitating the Claus reaction, in a second catalytic reaction zone to produce elemental sulfur vapor therein, the second catalytic reaction zone being maintained at a dewpoint approach as low as about 1°-15° F. (0.5°-8° C.);

(h) cooling the gas produced in the second catalytic reaction zone to condense the elemental sulfur vapor and recovering elemental sulfur therefrom; then,
(i) reacting the cooled gas, in the presence of a catalyst for facilitating a Clause reaction to produce elemental sulfur on said catalyst, said cooled gas being at a temperature sufficiently low to permit the reaction in the third catalytic reaction zone to proceed below the dewpoint of elemental sulfur;
(j) cooling the gas from the third catalytic reaction zone;
(k) discharging the gas produced in step (j);
(l) continuing steps (a) through (k), inclusive, until catalyst loading reaches a predetermined level below that at which instantaneous recovery starts to fall; then
(m) passing the heated gas of step (c) to the second catalytic reaction zone to vaporize sulfur on the catalyst and to regenerate said catalyst; then
(n) cooling gas from the third catalytic reaction zone to condense the elemental sulfur vapor and recovering elemental sulfur; then,
(o) heating the cooled gas, then,
(p) passing the heated gas to the third catalytic reaction zone to vaporize sulfur on the catalyst and to regenerate said catalyst; then,
(q) cooling the gas to condense the elemental sulfur vapor and recovering elemental sulfur; then
(r) reacting the cooled gas in the first catalytic reaction zone, in the presence of a catalyst for facilitating the Claus reaction, the temperature in the first catalytic reaction zone being maintained below the dewpoint of the sulfur;
(s) discharging the gas from the first catalytic reaction zone, steps (n) through (s), inclusive, being carried out only until the catalyst in the second and third catalytic reaction zones is regenerated, step (l) being carried out the rest of the time.

8. Process as in claim 7 wherein step (l) comprises continuing step (a) through (k), inclusive, until the instantaneous recovery of elemental sulfur falls below a predetermined level.

9. The process of claim 7 wherein the gas in step (c) is heated to the temperature in the range of about 430°-625° F. (221°-329° C.), the gas in step (f) is heated to the temperature in the range of about 370°-450° F. (188°-232° C.), and the gas in step (i) is at an inlet temperature in the range of about 250°-280° F. (121°-138° C.).

10. The process of claim 9 wherein heating in step (c) is effected by adding hot gas from said thermal reaction zone to the gas produced in step (b).

11. The process of claim 10 wherein heating in step (f) is effected by heat transfer in a heat transfer zone with the gas produced in step (d).

12. The process of claim 10 wherein the temperature of the heated gas of step (f) is controlled by selecting the amount of gas to bypass the heat transfer zone.

* * * * *